United States Patent [19]
Stecher et al.

[11] Patent Number: 5,391,333
[45] Date of Patent: Feb. 21, 1995

[54] METHOD OF MAKING A GASKET

[75] Inventors: Friedhelm Stecher, Lohrstrasse 72, D-5090 Leverkusen-Hitdorf; K. Gerd Friedrichs, Beilngries, both of Germany

[73] Assignee: Friedhelm Stecher, Leverkusen-Hitdorf, Germany

[21] Appl. No.: 890,599

[22] PCT Filed: Nov. 14, 1991

[86] PCT No.: PCT/EP91/02149
§ 371 Date: Jul. 13, 1992
§ 102(e) Date: Jul. 13, 1992

[87] PCT Pub. No.: WO92/08916
PCT Pub. Date: May 29, 1992

[30] Foreign Application Priority Data

Nov. 14, 1990 [DE] Germany .............. 4036255
Nov. 15, 1990 [DE] Germany .............. 4036439
Apr. 11, 1991 [DE] Germany .............. 4111791
Jul. 15, 1991 [EP] European Pat. Off. ....... 91111793

[51] Int. Cl.⁶ .................................. B29C 43/58
[52] U.S. Cl. ........................... 264/40.1; 264/220; 264/320; 425/DIG. 47
[58] Field of Search ............ 264/40.1, 219, 220, 264/319, 320; 425/DIG. 47

[56] References Cited

U.S. PATENT DOCUMENTS 3,205,703  9/1965  Horvereid ............ 264/40.1
3,740,062  6/1973  Robins .
4,244,908  1/1981  Hirasuna ............ 264/347
4,776,912 10/1988  Laval .
4,813,691  3/1989  Schoenborn ........ 277/235 B

FOREIGN PATENT DOCUMENTS 1923482 11/1970 Germany .
2228155 12/1973 Germany .
 392284  1/1991 Germany .
59-217060 12/1984 Japan .

Primary Examiner—Vargot: Mathieu D.
Attorney, Agent, or Firm—Sixbey, Friedman, Leedom & Ferguson

[57] ABSTRACT

A gasket, particularly a cylinder head gasket is described, which is made from a pressure-resistant and non-deformable material. Unlike in the case of the known gaskets, it is permanently shaped prior to assembly. The sealing surface is shaped complimentary to the deflection or sagging of the surfaces to be sealed, so that at all bearing points in the use case there is the thickness distribution required for a necessary pressure distribution. The corresponding topography is obtained in that a deformable assembly pattern is fixed under operating conditions between the surfaces to be sealed and copies are made of said assembly pattern.

9 Claims, 2 Drawing Sheets

METHOD OF MAKING A GASKET

BACKGROUND OF THE INVENTION

The invention relates to a gasket, particularly a cylinder head gasket, as well as to a process for the production thereof.

Gaskets and in particular cylinder head gaskets, require at the sealing point a specific contact pressure to enable then to fulfil their function. In the case of larger sealing surfaces, such as between a cylinder head and a cylinder block of internal combustion engines, this contact pressure is produced with the aid of screws, the forces having to be distributed in a planned manner over the surface.

On reaching an adequate contact pressure or sealing force between two screws on the gasket, there is a certain deflection or sagging of the surfaces to be sealed. In order to obtain a sealing action in spite of these different deflections of the facing sealing surfaces, use is conventionally made of soft gaskets or packings. The latter undergo thickness deformation on assembly or installation, so that there is a function-ensuring pressure distribution.

A gasket of the present type is known from German Published Application 19 23 482. In the unassembled state, circular sealing combs projecting from the sealing plane are arranged concentrically round the combustion chamber openings and alternating therewith there are depressions in the sealing plane. The height of the sealing combs is adapted to the screw spacings. As a result of this measure, after fitting between the sealing surfaces, i.e. after fixing the gasket, as a result of the increased contact pressure acting on the sealing combs there is a material flow from said combs to the depressions, so that the sealing comb which is to be almost completely recovered adapts to the precise contour of the sealing surface which is never precisely planar as a result of distortion. However, there is a risk of the sealing surfaces being damaged by these combs.

In addition, German Published Application 39 22 284 discloses a cylinder head packing essentially made from soft material, in which there are at least two juxtaposed passage openings separated by a web. On the edges or rims of the passage openings, the soft material is provided with metallic, circular, cross-sectionally U-shaped combustion chamber borders. On the web is placed a metal reinforcement, which at least on one side has a predetermined curvature for compensating the deflection of the sealing surfaces. However, there is no accurate, individual adaptation of the curvature of the reinforcing insert to the deflection line of the sealing surface.

German Published Application 22 28 155 discloses soft gaskets with cross-sectionally adapting sheet metal plates on the web between two passage openings. However, this only leads to a very approximate adaptation to the shape of the surfaces to be sealed, because the cross-sectional change occurs in relatively large steps. It is particularly disadvantage with said stepwise thickness adaptation, that it is not possible along a closed sealing line without leakage points.

It is considered disadvantageous in such soft gaskets, that initially they must be deformed in the assembly state under the same screw forces under which they must subsequently function in "stable" manner in the operating state without any further deformation. A further disadvantage is the complicated construction of the gasket solely for the purpose of obtaining the necessary contact pressure distribution by an engine-corresponding thickness distribution over the surface during the assembly phase.

Another problem is the precise maintenance of the assembly thickness, because there are relatively significant fluctuations in the soft material thickness and this is also additionally dependent on the deformability of the sealing material and the level of the screw forces. It is also problematical that a considerable proportion of the material components of a soft gasket is not recyclable.

Moreover metal gaskets have long been in use, which are made from a relatively soft metal. However, it is considered disadvantageous in connection therewith that the local deformation require higher forces on assembly to obtain a smaller thickness and consequently no planned contact pressure is possible. During assembly or fitting, such gaskets cannot be supplied with the necessary contact pressure at precisely the desired points. No planned contact pressure can be obtained with metal gaskets that are deformable during installation. Such gaskets can only be used in those cases where high screw forces are available. Conversely this precludes the use for lightweight constructions.

In addition, metal gaskets are often provided with stiffening corrugations, which are height-deformed during installation and are intended to locally give the gasket an improved adaptation. However, this leads to the disadvantage that, at the points with the maximum assembly thickness, a bearing action is only exerted by the corrugation, which as a result of thermal component deformation, like a soft gasket, can be further deformed in operation.

SUMMARY OF THE INVENTION

The object of the invention is to provide a gasket of the aforementioned type, as well as a production process for the sane, in which the sealing action is improved and at the sane tile the stability is increased.

This object is achieved in that at least at all the bearing points in the use case, prior to assembly a three-dimensional sealing surface complimentary to the deflection of the surfaces to be sealed is permanently shaped.

The object is achieved by the following process steps:
a) producing an assembly pattern in such a way that a plastically deformable material is fixed between the surfaces to be sealed and
b) copying the topography of the assembly pattern.

A fundamental idea of the invention is that unlike in the case of the known gaskets which, despite partial topographical thickness deformation during assembly require a plastic deformation, the correct thickness distribution for the particular case is produced during manufacture. In addition, the gasket according to the invention has at least at all the bearing points the complete topography necessary for the pressure distribution prior to assembly. As a result of the chosen, non-thickness-deformable material the screw forces are distributed a in planned manner on the bearing surfaces to be sealed. As the gasket according to the invention has an absolutely stable construction, it can be produced with much higher deforming forces than occur during the subsequent assembly state. Once a thickness distribution is established as optimum, it is retained during local operationally caused changes. Pressure changes consequently do not lead to irreversible deformations, but instead cause reversible pressure changes. This leads to a permanent, optimum sealing effect.

Another basic idea of the invention is that the topography is experimentally determined under operating conditions, e.g. using an assembly pattern and the latter, optionally following conversion, serves as an original copy. Using the example of internal combustion engines, for a specific engine an optionally calculated "positive impression" is produced in a 1:1 scale and this necessarily precisely takes up the space to be sealed between the cylinder head and the engine block.

Tests have shown that it is adequate to produce a single assembly pattern, e.g., for a specific engine type, and that on the basis of this assembly pattern, it is possible to produce gaskets for said engine type in large numbers and with adequate precision.

The invention also has the advantage that there is no problem in recycling the waste occurring during production and also the actual gasket, because essentially only one material and not an inseparable combination of different materials is used.

A further important advantage is that the screw forces can be reduced. Unlike in the prior art, where in the vicinity of the screws the contact pressure is much higher than in the intermediate areas, here it is substantially the same over the entire sealing surface for sealing a medium. The sealing surfaces for sealing combustion gases must have a much higher contact pressure than those e.g. for water. It is therefore also possible to use weaker screws for the connection of the cylinder head and the cylinder block, because it is only necessary to produce the contact pressure effectively required.

The gasket is preferably made from a material, which is pressure-resistant and not thickness-deformable under the contact pressure in the assembly state.

Suitable materials are steel, aluminium or an alloy thereof, plastic or a mixture of metal and plastic granules.

It is particularly advantageous that the gasket has a continuous thickness distribution, because an improved support of the sealing surfaces is obtained. This in particular avoids any distortion or buckling of the cylinder or the rim of the combustion chamber passage openings. In the prior art these deformations occur as a result of a torque around the screws/threaded holes. The area projecting over the sane acts as a lever with which it presses over the edge of the passage openings onto the cylinder edge located below the same.

According to a preferred development of the invention the non-bearing and therefore non-sealing surface areas have a stepwise thickness reduction on one or both sides compared with the bearing surfaces. This leads to the advantage that there is a further planned distribution and consequently reduction of the screw forces on the sealing surfaces.

To compensate surface roughnesses of the surfaces to be sealed, it can be appropriate to provide the three-dimensional sealing surface within the bearing areas at least partly with a layer which is pressure-deformable in the micro-range. This leads to the advantage of a peak-to-valley roughness compensation, e.g. by a paint coating and the contact with the dimensionally stable sealing material is maintained.

It is advantageous for the three-dimensional sealing surfaces complimentary to the deflection of the surfaces to be sealed to be shaped on opposite sides and facing sealing surfaces are preferably unequal with respect to expansion and/or shape.

According to a preferred development of the production process, during copying and whilst taking account of engine-specific and/or different operating states, changes are made to the topography. In this way the topography can, if necessary, be corrected or predetermined areas can be loaded or load-relieved in a planned manner. For example, during the production of an assembly pattern the webs between two combustion chamber passage openings can be loaded less than the comparable outer areas. Correspondingly the assembly pattern has a smaller thickness in said outer areas. However, this leads to an undesired distortion of the cylinder head. If these undesired deformations are corrected during copying, this has the advantage that the cylinder head is not distorted to such an extent.

It can be particularly advantageous that the thickness distribution is produced in the predetermined sealing areas during the copying process in such a way that although the gasket is pressure-relieved, there is still a large-area contact of the sealing surfaces in the installed state. Thus, in these areas the gasket fills the cavity present as a result of the deflection or sagging of the surfaces to be sealed without any dead zone and the pressure is withdrawn or completely removed in a planned manner. This preferably takes place along the combustion chamber passage openings.

Another preferred development of the production process comprises the copying process having the following steps:

c) scanning the assembly pattern with a thickness meter and storing the test data in a data processing equipment, d) producing the topography in the data processing equipment on the basis of the test values and whilst optionally calculating engine-specific parameters, and e) producing a shaping tool with a negative shape of the gasket by means of a material-removing process under the control of the data processing equipment.

A stamping tool or a mold is particularly suitable as the shaping tool.

It is also appropriate that the assembly pattern, produced under different operating states of the surfaces to be sealed, is evaluated and the test data determined are calculated for producing a topography, so as to bring about an optimum adaptation, whilst taking account of the different operating states.

The stability is optimized in that the gasket is subject during production to deforming forces, which are higher than the contact pressures occurring in operation.

In addition to or as an alternative to the aforementioned process steps, it can be advantageous for the starting material to be e.g. thermally or chemically brought into an easily deformable state and for the material to be hardened after shaping.

Another preferred development of the production process comprises, in a plate-like starting material, initially a locally different envelope thickness distribution, that is inverted compared with the subsequent thickness distribution, is obtained by impressing and simultaneous growing out of a predetermined topography, that subsequently by a removing working process a uniform thickness is produced and that finally the final shape is pressed in without any lateral flow of the material.

It is also appropriate that the bearing surface areas intended for sealing purposes are raised by immediately adjacent impressed depressions from an originally uniformly thick starting plate. The gasket can be produced with very few operating steps in that the prominent bearing surface areas are given the final thickness distribution at the time of impressing the adjacent depressions by a material displacement.

According to a further development, in order to bring about an optimum adaptation the prominent, bearing surface areas are given the maximum thickness, preferably by material displacement and accompanied by the simultaneous impression of the depressions and the final thickness distribution is produced in a subsequent stamping step.

It is advantageous that a projection is produced by an impression on neighboring sides.

It can also be advantageous to make the impressions in areas, which in a following process step are stamped out for producing openings.

The invention is described in greater detail hereinafter relative to preferred embodiments of the invention:

DETAILED DESCRIPTION OF THE PREFERRED EMBODIMENTS

Figure 1:
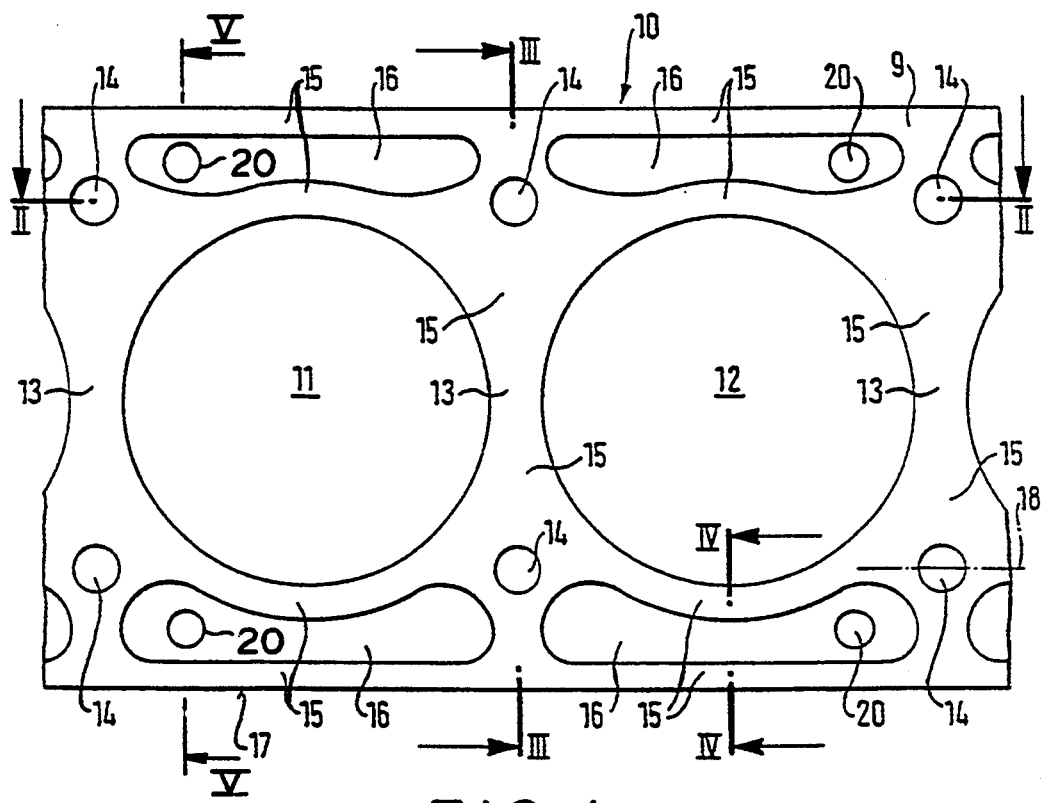
FIG. 1 is a partial plan view of a gasket.

The cylinder head gasket 10 shown in FIG. 1 comprises a gasket plate 11 made from a material which, in the assembled state and under operating conditions, is pressure-resistant and is not thickness-deformable, e.g. aluminium or heat-resistant plastic. On its top and bottom, it has topographical surfaces projecting from the drawing plane and which will be described in greater detail hereinafter. The represented portion of the gasket plate 11 has two juxtaposed combustion chamber passage openings 11, 12, between which there is a web 13. There are also openings 14, which in the installed state between a cylinder head and a cylinder block of an unillustrated internal combustion engine receive the screws for pressing the sealing surfaces.

The cylinder head gasket has bearing and therefore sealing areas 15, as well as non-bearing areas 16 distributed in island-like manner therein. The distribution of the bearing and non-bearing areas 15, 16 is determined by the distribution of the combustion chamber passage openings 11, 12, the non-bearing areas 16 with openings 20 and the screw openings 14. Bearing areas 15 are in each case arranged in an uninterrupted manner around the combustion chamber passage openings 11, 12 and also along the plate edges. The non-bearing areas 16 are located between the edge bearing areas 15 and an imaginary line 18 which runs parallel to the plate edges through the centers of the screw openings 14 associated with said plate edge. In the non-bearing areas 16, the openings 20 for the water and oil drain lines or the like are stamped out.

Figure 2:
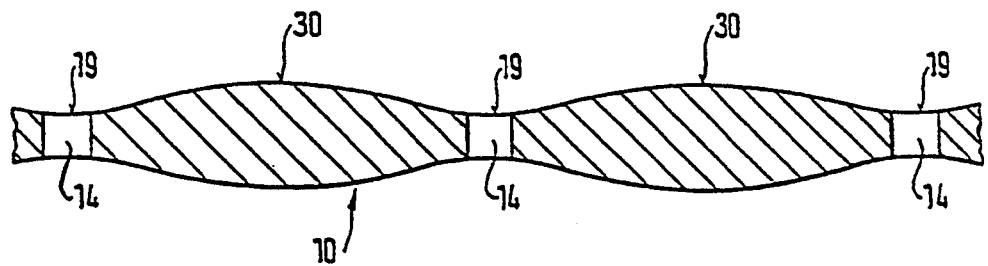
FIG. 2 is a vertical cross-section through the gasket along the section line II—II of FIG. 1.

The vertical cross-section, along the section line II—II of FIG. 1 according to FIG. 2 shows the topography of the cylinder head gasket 10 parallel to the plate edges in one of the lines 18 in a bearing area 15. The thickness distribution is permanently predetermined prior to assembly in that the surface pattern is shaped in accordance with the pressure distribution needed in the assembled state. Therefore the minimum thickness is in the vicinity of the screw openings 14. From this low point 19 the thickness continuously rises to a maximum 20 in the center between two screw openings 14. This curve substantially corresponds to the bending line of a cylinder head in the screwed-down state. The invariable, predetermined assembly thickness is therefore shaped precisely to the cavity formed during the screwing together of the cylinder head and cylinder block. In the present embodiment the topographies of the top and bottom are different.

Figure 3:
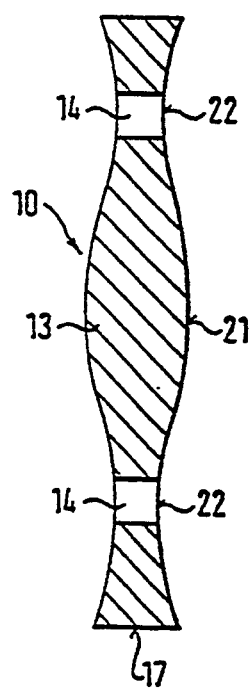
FIG. 3 is a vertical cross-section through the gasket along a section line III—III of FIG. 1.

The vertical section along the section line III—III in FIG. 3, which runs transversely through the web 13 and two screw openings 14, shows that the cylinder head gasket 10 is also permanently topographically shaped prior to assembly in the transverse direction. The cross-sectional thickness has a maximum 21 in the center between the screw openings 14 and minima in the vicinity of the screw openings 14. The thickness increases continuously towards the plate edges or rims 17. The otherwise continuous path of the surface deformation once again substantially corresponds to the corresponding bending line of the associated cylinder head and the deformations of the block sealing surface in the installed state.

Figure 4:
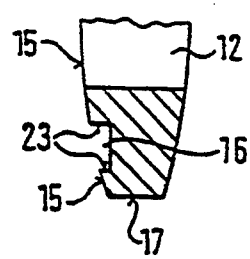
FIG. 4 is a vertical cross-section through the gasket along the section line IV—IV of FIG. 1.

By means of the section taken along IV—IV in FIG. 1, FIG. 4 line shows that the non-bearing areas 16 are recessed below the otherwise continuous surface of the bearing areas 15, accompanied by the formation of steps 23.

Figure 5:
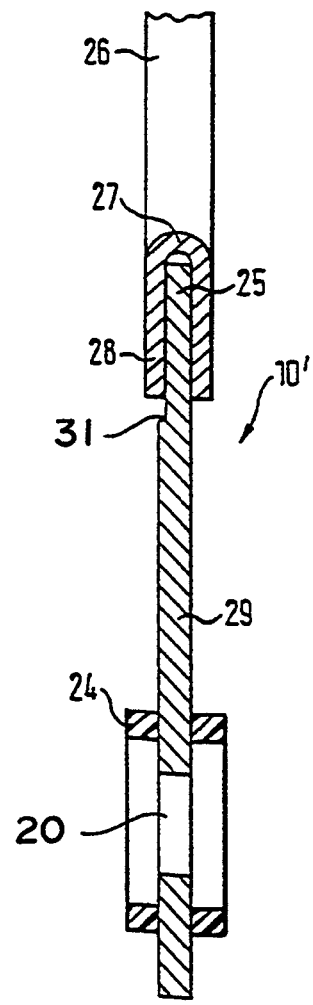
FIG. 5 is a sectional view along line V—V of FIG. 1, but showing another gasket embodiment.

A further embodiment of a cylinder head gasket 10' is shown in FIG. 5 and has a combination of areas 25 with a permanently predetermined thickness distribution in particularly highly pressurized areas and an elastomeric seal 24. In the represented embodiment, which is equivalent to a cross-section along a section line V—V in FIG. 1, it is the highly pressurized area 25 around the marginal area of a combustion chamber passage opening 26, is reinforced with a metal flange 27 having a U-shaped cross-section. As the thickness distribution of this marginal area 25 is predetermined in an invariable manner, at the latest when screwing down the gasket, the flange 27 is correspondingly deformed, so that also the corresponding leg 28 of the flange 27 has an accurate fitting topography. In the present embodiment the flange is mainly used for heat protection purposes, whilst the thickness distribution is predetermined by the bordered edge will fit when deformed as noted.

The gasket 10' is thinner than on the reinforced sealing rim in the remaining surface area 29. The elastomeric seal 24 is used for the sealing of openings 20 for the oil and water drain lines or the like.

With reference to FIGS. 1 to 4, a description will now be given of the production process for the cylinder head gasket 10. A deformable assembly pattern is placed between a cylinder head and a cylinder block (not shown) and then the cylinder head and block are screwed together in the conventional manner. In this way a positive impression of the gasket to be produced is obtained. Optionally the engine can be operated according to a predetermined program before taking the assembly pattern.

The assembly pattern is then scanned with a thickness meter to determine the topography. The test data are stored in a computer. The scanning in the vicinity of the combustion chamber passages preferably takes place radially and preferably in a cartesian manner in the vicinity of the remaining surface. In addition, a specific initial loading takes place, to eliminate any separations in the material.

The determined test values are calculated with engine-specific data, which means that, whilst taking account of the operating and material parameters of the engine, measured values, determined within predetermined ranges within the sealing surface, are subject to a predetermined increase or decrease.

On the basis of these possibly modified test data, using a computer aided design, a topography of the gasket is produced. The topography is complimentary to the shape of the associated surface to be sealed. The topographic data are subsequently used for the control of a material-removing tool with which a negative shape of the gasket is produced. The tool is in particular a CNC-controlled milling cutter or an eroding electrode. In the control of the tool it is ensured that continuous height transitions are produced.

By means of the negative shape a blank of the cylinder head gasket is produced by pressing or moulding. All the combustion chamber openings 11, 12, as well as the water and oil drain line openings 20 and optionally those for mechanical relief purposes are stamped out following the production of the blank. This can be followed by a surface treatment. For the case that microdensity characteristics are required, the gasket is also coated with plastic or paint.

We claim:

1. Method for producing a cylinder head gasket for an engine which, prior to assembly is already adapted to a deformation of a cylinder head and engine block to be sealed occurring in an operating state, comprising the steps of:
   determining the topography of a cavity, which is formed between the sealing surfaces of the cylinder head and engine block to be sealed due to bending forces imposed on the cylinder head and the engine block in an assembly state;
   b) evaluating the determined topography and modifying topographical values determined as a function of the effect of engine-specific parameters under different engine operating conditions, so that a pressure distribution necessary for sealing is achieved considering operating and material parameters of the cylinder head and engine block to be sealed;
   c) forming of the cylinder head gasket in accordance with the modified topographical values according to step b), using a material which, in the assembled state and under all operating conditions, is pressure-resistant and rigid against thickness-deformation, so that the cylinder head gasket has, at least in every bearing sealing area, a prefabricated, three-dimensional uninterrupted sealing surface which is complementary to deflection of the surfaces to be sealed.

2. Method according to claim 1, wherein a single assembly pattern is produced under said different operating conditions of the engine and test data established for the different operating conditions of the engine wherein the test data established are evaluated together for producing the shape of the gasket, so as to adapt the gasket to the different operating conditions.

3. Method according to claim 1, wherein said determining comprises the step of producing an assembly pattern in such a way that a plastically deformable material is secured between the surfaces to be sealed and wherein said evaluating and modifying step comprises the step of copying the topography of the assembly pattern.

4. Method according to claim 3, wherein during said evaluating and modifying step changes are made to the shape of the gasket relative to the topography of the assembly pattern based on specific component related parameters.

5. Method according to claim 3, wherein the evaluating and modifying step comprises the following steps:
   removing the assembly pattern from between the surfaces to be sealed and scanning the assembly pattern with a thickness meter and storing the test data in a data processing equipment,
   producing a topography in data processing equipment on the basis of test values produced from operation of the engine and;
   producing a stamping tool with a negative shape of the topography produced in the data processing equipment by means of a material-removing process and under the control of the data processing equipment.

6. Method claim according to claim 3, wherein said scanning step is performed radially in the vicinity of combustion chamber openings of the assembly pattern.

7. Method claim according to claim 6, wherein the scanning step is performed in a Cartesian manner outside of the vicinity of the combustion chamber openings of the assembly pattern.

8. Method according to claim 3, wherein deforming forces are applied to the plastically deformable material during said producing step which are higher than contact pressures occurring between said sealing surfaces in the assembly state and in subsequent operating states of the engine.

9. Method according to claim 1, wherein said forming step is performed so as to produce a gasket body having a solid one-piece construction.

* * * * *